(12) United States Patent
Morgan et al.

(10) Patent No.: US 9,423,781 B2
(45) Date of Patent: Aug. 23, 2016

(54) MODEL BASED CONTROL WITH ENGINE PERTURBATION FEEDBACK

(71) Applicant: General Electric Company, Schenectady, NY (US)

(72) Inventors: Victor John Morgan, Greenville, SC (US); Tomas A. Velez, Greenville, SC (US)

(73) Assignee: General Electric Company, Schenectady, NY (US)

( * ) Notice: Subject to any disclaimer, the term of this patent is extended or adjusted under 35 U.S.C. 154(b) by 613 days.

(21) Appl. No.: 13/853,332

(22) Filed: Mar. 29, 2013

(65) Prior Publication Data
US 2014/0297053 A1 Oct. 2, 2014

(51) Int. Cl.
*G05D 11/00* (2006.01)
*G05B 17/02* (2006.01)
(52) U.S. Cl.
CPC ........................................ *G05B 17/02* (2013.01)
(58) Field of Classification Search
CPC ........................................................ G05B 17/02
USPC ................................................. 700/288, 291
See application file for complete search history.

(56) References Cited

U.S. PATENT DOCUMENTS

| 4,269,030 A | 5/1981 | Osborne |
| 5,886,895 A * | 3/1999 | Kita ........................ F01K 13/02 700/28 |
| 6,364,602 B1 | 4/2002 | Andrew et al. |
| 6,684,163 B2 | 1/2004 | Antoine et al. |
| 7,003,940 B2 | 2/2006 | Groppi et al. |
| 7,058,552 B2 * | 6/2006 | Stothert ............... G05B 13/042 700/36 |
| 7,774,290 B2 | 8/2010 | Marfatia et al. |
| 2012/0070266 A1 | 3/2012 | Schaberg et al. |

* cited by examiner

*Primary Examiner* — Mohammad Ali
*Assistant Examiner* — Sheela S Rao
(74) *Attorney, Agent, or Firm* — Nixon & Vanderhye P.C.

(57) ABSTRACT

A method to control an power generation plant including: applying control settings to operate the plant; collecting plant data indicative of the performance of the plant; applying the control settings to a model of the plant; collecting prediction data from the model; comparing the plant data to the predicted data and adjusting the control settings applied to the plant and model; perturbing the control settings and applying the perturbed control settings to operate the plant and the model; collecting perturbed plant data and perturbed prediction data, and modifying the model if the perturbed plant data represents an improvement as compared to the perturbed prediction data.

23 Claims, 6 Drawing Sheets

MODEL BASED CONTROL WITH ENGINE PERTURBATION FEEDBACK

BACKGROUND OF THE INVENTION

The invention relates generally to controlling power generation plants, which may include gas turbines, steam turbines and heat recovery steam generators (HRSGs). In particular, the invention relates to model based control systems for power generation plants.

Model based control (MBC) systems are well-known and conventional for controlling power generation plants. For example, MBC systems are used to predict optimal operating control settings for industrial gas turbine engines. The MBC system models the operating engine and generates predicted levels of optimal performance for the engine. The MBC system may model the engine in real-time such that the predicted performance levels correspond to current operating conditions of the engine.

By generating predicted optimal performance levels, the MBC system provides a standard against which to measure the actual performance of a power generation plant. The results of the measurement may be applied in a feedback control loop to adjust the actuators that adjust the control input settings for the plant. By comparing the actual performance of the plant to the performance predicted by the MBC system, adjustments may be made to the actuators, such as fuel flow and inlet guide vane position, to improve the performance of the plant. These adjustments may be made in real time so that the plant is operated optimally.

MBC systems typically drive a power generation plant towards the optimal performance predicted by the model of the plant. The optimal performance of the plant is assumed to be optimal performance predicted by the model.

It may not always case that the model accurately predicts the optimal performance conditions of the power generation plant. The model in a MBC system incorporates certain assumptions and estimates regarding the plant and its current operating condition. To the extent that the assumptions and estimates do not accurately represent the plant, the predicted performance conditions generated by the model may not represent the optimal performance conditions for the power generation plant.

Suboptimal performance of a power generation plant can reduce the fuel consumption of the plant, increase the power generated by the plant, reduce emissions from the plant and reduce wear on the plant. There is a long felt need for control systems that govern power generation plants to achieve their optimal performance.

BRIEF DESCRIPTION OF THE INVENTION

A model of a power generation plant, which may include one or more of a gas turbine engine, steam turbine HRSG and auxiliary power generation system, generally incorporates assumptions regarding the plant. These assumptions may include that the plant operates in accordance with a standard model of the plant and has not degraded during operation or the degradation has occurred in a predicted manner. Because there may be variations between plants of the same model and the plant may degrade differently than predicted, the model may not fully simulate the operation of the actual plant.

The applicants conceived of a technique to test whether the optimal performance predicted by a model corresponds to the true optimal performance of a power generation plant, such as a gas turbine engine, steam turbine and HRSG. The technique perturbs the control inputs applied to the plant and model. The performance of the plant resulting from the perturbation is compared to the performance predicted by model due to the perturbation. If the plant performs better due to the perturbation, the model is adjusted to more accurately predict the performance of the plant and drive the plant towards the optimal performance achieved with the perturbation.

The technique conceived by applicants may be embodied as a method or logic system executed by a controller, such as a computer executing control instructions, e.g., an executable program, stored in non-transitory memory. The technique captures and corrects for variations between power generation plants of the same model, and the actual degradation of power generation plant. The technique may correct for these variations in real time to ensure that the power generation plant operates at or near an optimal operating point.

The technique perturbs the control input settings for the control inputs, such as actuators of inlet guide vanes, turbine inlet temperatures, fuel flow and steam flow. Perturbing the control input setting deviate the settings from the optimal settings predicted by the MBC system. The deviations may be small, within allowed limits and limited to a single control input for each perturbation. The deviations may be applied at various plant conditions, e.g., at several power output levels, and applied periodically during the operation of the plant.

The performance of the power generation plant in response to the deviations is measured. If the performance improves, the rate of change, e.g. slope, of the performance in response to the deviation may be used to indicate the direction and amount of change to be made to the modeled plant.

A method has been conceived to control a power generation plant comprising: applying control settings to operate the power generation plant; collecting plant data indicative of the performance of the power generation plant operating at the control settings; applying the control settings to a model of the power generation plant; collecting prediction data from the model indicative of the predicted performance of the power generation plant operating with the applied control settings; comparing the engine data to the predicted data to adjust the control settings applied to the power generation plant and model; perturbing at least one of the control settings and applying the at least one perturbed control settings to operate the power generation plant and to the model; collecting perturbed engine data indicative of the performance of the power generation plant operating at the at least one perturbed control settings; collecting perturbed prediction data from the model indicating the predicted performance of the engine operating at the applied perturbed control settings, and modifying the model if the perturbed power generation plant data represents an improvement as compared to the perturbed prediction data.

The plant may be one or more of a gas turbine engine, steam turbine, HRSG and other auxiliary power generation system, and the model may be based on a software program executed by a computer. The steps may be performed during operation of the plant and repeatedly. The steps of modifying the model may be performed after repeatedly performing the steps of perturbing the control settings and applying the perturbed control settings to operate the plant and to the model and collecting perturbed plant data and the perturbed prediction data. The steps of perturbing the control settings may be performed at various ambient air temperatures. The step of modifying the model may be performed only if the amount of the improvement exceeds a threshold. The steps of perturbing the control settings and applying the perturbed control settings to operate the plant and to the model, and collecting perturbed plant data and the perturbed prediction data may be performed while the plant operates at a certain operating condition(s), such as at steady state.

A system has been conceived to control for an power generation plant comprising a computer and a non-transitory memory storing instructions that are performed to cause the system to: apply control settings to operate the plant at a performance level determined by the control settings; collect plant data indicative of the performance of the plant operating at the control settings; apply the control settings to a model of the plant; collect prediction data from the model indicative of the predicted performance of the plant operating at the applied control settings; compare the plant data to the predicted data to adjust the control settings applied to the plant and model; perturb the control settings and apply the perturbed control settings to operate the plant and to the model; collect perturbed plant data indicative of the performance of the plant operating at the perturbed control settings; collect perturbed prediction data from the model indicative of the predicted performance of the plant operating at the applied perturbed control settings, and modify the model if the perturbed plant data represents an improvement as compared to the perturbed prediction data.

An assembly has been conceived of an power generation plant and a controller including a computer and a non-transitory memory storing a program that when executed causes the controller to: apply control settings to operate the plant at a performance level determined by the control settings; collect plant data indicative of the performance of the plant operating at the control settings; apply the control settings to a model of the plant; collect prediction data from the model indicative of the predicted performance of the plant operating at the applied control settings; compare the plant data to the predicted data to adjust the control settings applied to the plant and model; perturb the control settings and apply the perturbed control settings to operate the plant and to the model; collect perturbed plant data indicative of the performance of the plant operating at the perturbed control settings; collect perturbed prediction data from the model indicative of the predicted performance of the plant operating at the applied perturbed control settings, and modify the model if the perturbed plant data represents an improvement as compared to the perturbed prediction data.

DETAILED DESCRIPTION OF THE INVENTION

Figure 1:
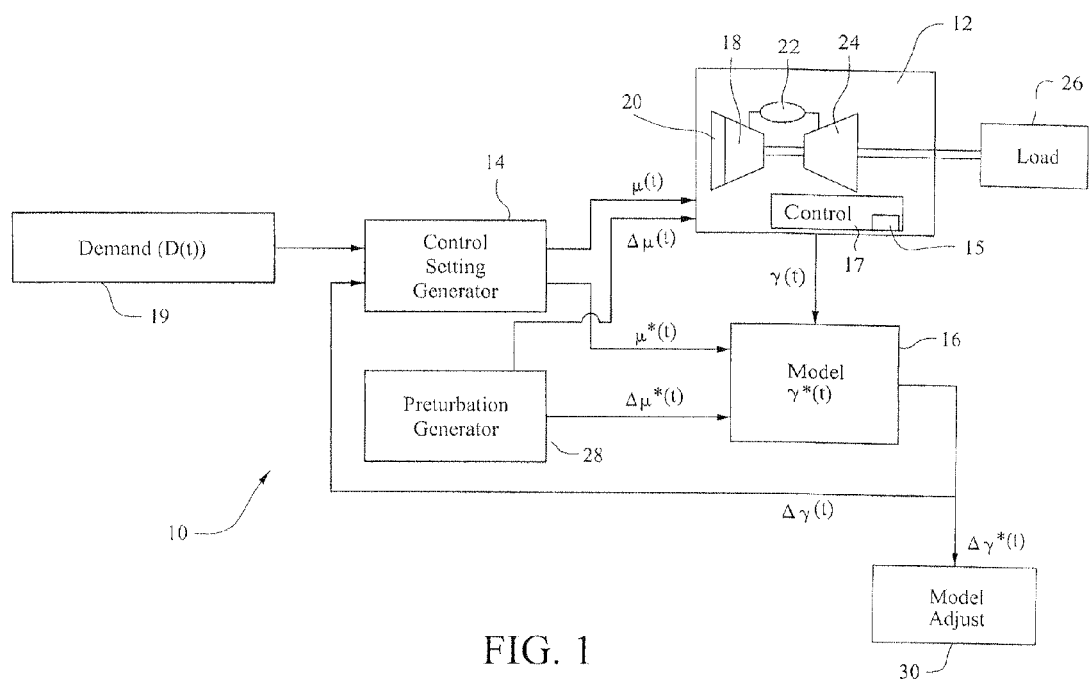
FIG. 1 is a schematic diagram showing a portion of a conventional gas turbine with a quarter section cut-away for a cross-sectional view of the turbine.

FIG. 1 is a schematic diagram showing an exemplary model based control system 10 that generates control settings for a gas turbine engine 12. The description of the gas turbine is applicable to other power generation systems such as steam turbines, HRSGs and auxiliary power generation. The control system includes a control logic generator 14 and a model 16 that simulates the operation of the engine. The control system 10 and model 16 may be logic systems, such as executable software programs and data stored in non-transitory memory 15 of a computer of the controller 17 for the gas turbine.

The control logic generator 14 outputs control settings during an operating time period (u(t)) of the gas turbine engine. These control settings are applied to control the engine 12 and are applied as inputs (u*(t)) to the engine model 16. The control settings may be applied to control actuators, e.g., solenoids, that set the fuel flow to the combustor of the gas turbine engine, the angle of the inlet guide vanes for the engine, and set other input devices associated with the gas turbine engine.

The control logic generator receives as an input a demand (D(t)) 19 which indicates, for example, the desired power output of the engine 12 and the load to be placed on the turbine. The control logic generator applies control inputs to the gas turbine engine to cause the engine to produce the power required to meet the demand or otherwise meet the demand input condition. The demand may be a single operational setting, such as full speed, full load (FSFL) setting. The demand may also be a sequence of operational settings, such as settings for sequencing an engine through startup, a steady-speed with load condition, and shut-down.

The gas turbine engine 12 generates power that drives an electrical generator or other power load 26. The power generated by the gas turbine engine typically corresponds to the demand (D(t)) applied to the control logic generator. The gas turbine engine 12 may include a compressor 18 with adjustable inlet guide vanes 20, a combustor 22 and a turbine 24. The engine may be a combined cycle gas turbine and steam turbine, or other type of engine or system of engines.

Control inputs (u(t)) to the gas turbine engine may include a flow rate for fuel to the combustor, the angular setting of the inlet guide vanes and the amount of inlet bleed heat (IBH) air diverted from the compressor and introduced into the inlet of the compressor. These control inputs are exemplary control inputs generated by the control setting generator 14 for the engine. The types of control inputs depend on the type of engine 12 or power generation plant, and the control settings that are produced by the generator 14.

The control setting generator 14 also provides control inputs (u*(t)) for the model 16 of the engine. The control inputs for the model are typically the same as or representative of the control inputs for the gas turbine engine. The control inputs for the model may differ from the control inputs for the engine to search for control inputs that improve the performance of the engine where the inputs are not at the settings, e.g., levels, predicted by the model 16.

The engine model 16 simulates the desired operation of the gas turbine engine 12 and may do so in real time. The engine model 16 receives performance data (y(t)) for the gas turbine engine 12. The performance data indicates the actual performance, which may be in real time, for the engine 12. The actual performance data (y(t)) may include information about the power output of the engine, load on the engine, exhaust gas temperature at the discharge of the turbine and ambient conditions.

The engine model or other logic unit compares the actual performance data (y(t))) to the performance data (y*(t)) generated by the model which represents the desired performance of the engine. The differences between the actual and desired performance (Δy(t)) may be output by the model 16 or other logic unit. The differences may or may not directly correspond to the performance data from the engine 12. For example, the model may convert the performance data from the engine to other performance indicative data, such as turbine inlet temperature, which may not be directly measured by sensors monitoring the engine.

The differences ($\Delta y(t)$) between the actual and desired performance are received by the control setting generator 14. This generator uses the differences ($\Delta y(t)$) to calculate the control settings ($u(t)$) for the engine 12 and the settings ($u^*(t)$) for the model. For example, the control setting generator may adjust the control settings to reduce the differences ($\Delta y(t)$) between the actual and desired performance of the gas turbine.

The deviations may be applied to the control inputs to the model and to the engine. The deviations cause the engine to operate at conditions deemed suboptimal by the model. The deviations in the control settings may be achieved by perturbing the control settings determined by the model.

The deviations in the control settings may be periodically applied to the gas turbine. For example, a perturbation may be applied at regular time intervals, at manually selected intervals, at various ambient temperature conditions or at various operating conditions of the gas turbine engine.

The control inputs to the control model and gas turbine engine are perturbed to search for operating conditions that improve the performance of the engine. The perturbations may be generated by a perturbation generation logic unit 28, which may be executable instructions stored in non-transitory memory and executed by a computer associated with the control system. The perturbations may be applied after the gas turbine engine has reached a steady state operating condition and the differences ($\Delta y(t)$) between the performance of the engine and the performance predicted by the model is zero or within a predetermined narrow range. The deviations may be combined, such as added or subtracted, to or from the control inputs to the model and engine. The deviations may be a uniform amount of deviation for a prescribed time interval or the deviation may vary of the interval that the deviation is applied.

The perturbations may be in the form of deviations (($\Delta u^*(t)$) applied to the control inputs (($u^*(t)$) to the model and (($\Delta u(t)$) applied to the gas turbine engines. The deviations (($\Delta u^*(t)$) and (($\Delta u(t)$) may be equal to or represent corresponding changes to the inputs to the engine and the model. The deviations may also be changes, such as shifts, in the value of the control inputs applied to the model and gas turbine engines.

The deviations may be slight changes, e.g., less than ten percent, less than two percent or in a range of ten to two percent, of the level of the control inputs (($u^*(t)$) and (($u(t)$). The deviations may also or alternatively be subject to predetermined limits, which may be used to ensure that the engine is not subjected to large or rapid changes in its operating state or operated at conditions that would be unsafe or might damage the engine.

The deviations applied to the control inputs shift the performance of the engine. The performance data ($y(t)$) from the engine operating with the control inputs combined with the deviations is collected and outputted to the model. Similarly, the model simulates the performance of the model operating with the control inputs combined with the deviations.

A determination is made as to whether the engine performs better while operating at the settings resulting from the perturbation than while operating at the control settings determined by the model. If the determination is that the perturbed settings improve the performance, the model or its inputs are adjusted such that the model more accurately predicts the true optimal performance of the engine. If the engine operates no better at the control settings resulting from the perturbation of the model, the model is not changed.

The performance of the gas turbine while operating with the control inputs ($y(t)\pm\Delta y(t)$) with the deviations is compared to its performance while operating with the control inputs ($y(t)$) to determine whether the performance is enhanced with the deviations to the control inputs. If the performance is enhanced, the control setting generator 14 may be adjusted to apply control inputs ($y(t)$) that correspond to the control inputs with the deviations (($y(t)\pm\Delta y(t)$).

Further, the performance data ($y^*(t)$) from the model may be compared to the performance data ($y(t)$)) from the engine while the control inputs include the deviations. For the period while the deviations are applied to the control inputs, the differences ($\Delta y^*(t)$) between the performance data generated by the model and engine indicate the accuracy of the model in predicting the performance of the engine. The differences ($\Delta y^*(t)$) may be applied to adjust the model, using a model adjust logic unit 30, such that it more accurately predicts the performance of the engine. After the model has been adjusted, the perturbation generator 28 may terminate the deviations (($\Delta u^*(t)$) and (($\Delta u(t)$) and allow the control inputs to return to the inputs (($u^*(t)$) and (($u(t)$) generated by the control setting generator 14.

Figure 2:
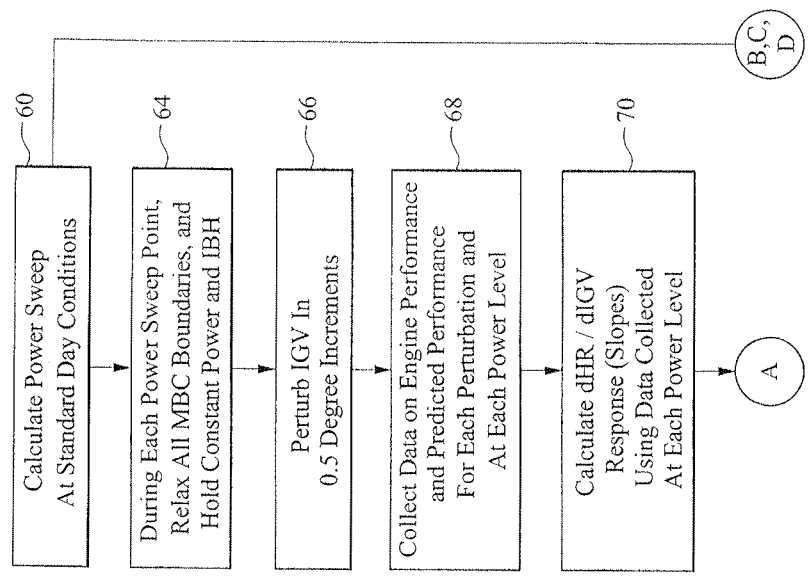
FIGS. 2 to 4 present a flow chart of an exemplary process for determining control inputs that provide optimal engine performance by perturbing the control inputs to the engine and model.
Figure 3:
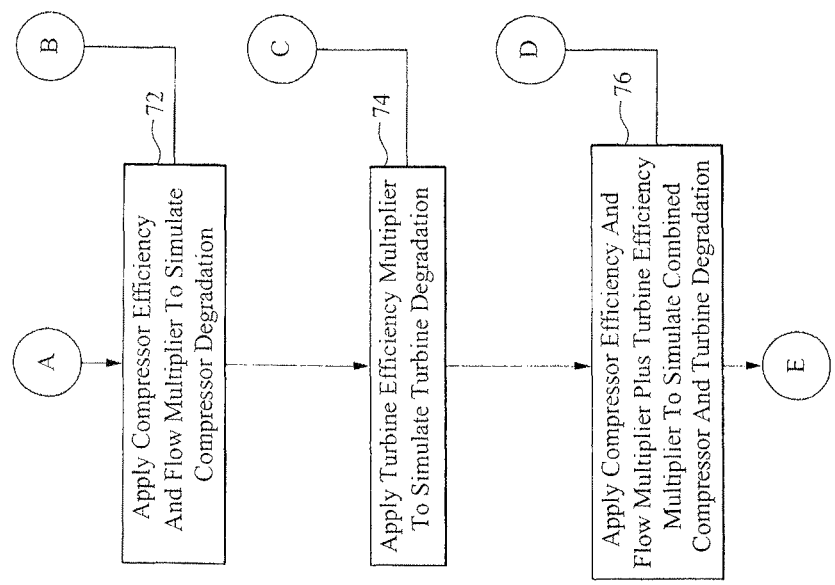
Figure 4:
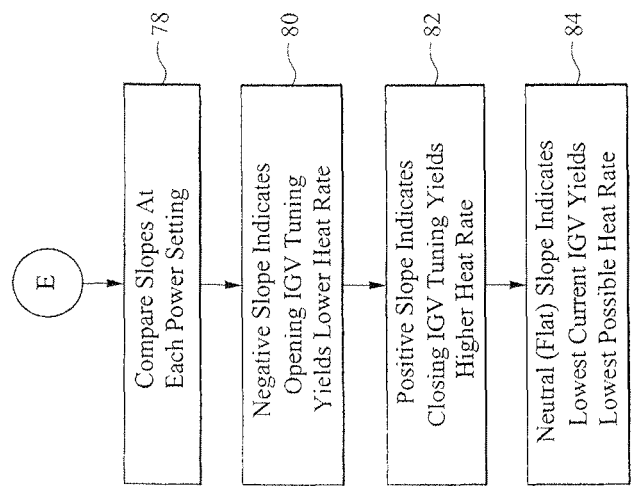

FIGS. 2 to 4 show an exemplary flow chart of instructions, e.g., executable software code, stored in a non-transitory memory 15 and performed by the computer controller 17 for a gas turbine engine. The instructions shown in the flow chart cause a gas turbine engine to operate over a range of conditions and operating under perturbations to the control inputs. The instructions collect data regarding the operation of the engine and the predicted performance of the model.

Figure 5:
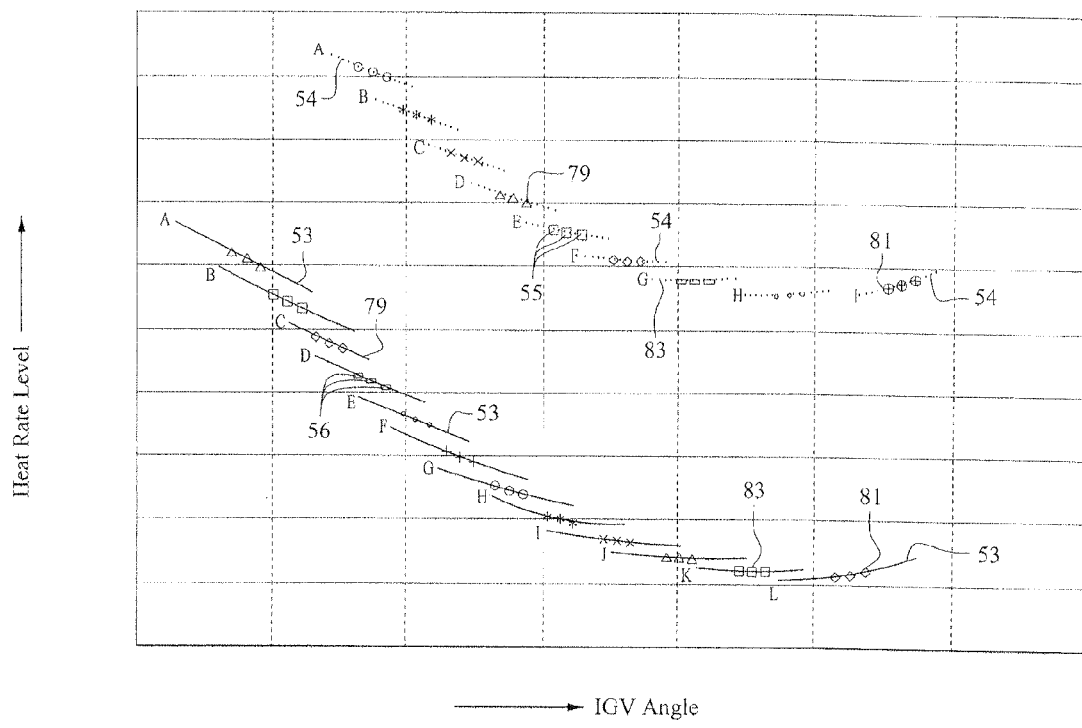
FIGS. 5 and 6 are exemplary charts illustrating the process of presenting data generated by a gas turbine engine and data generate by a model of the engine.
Figure 6:
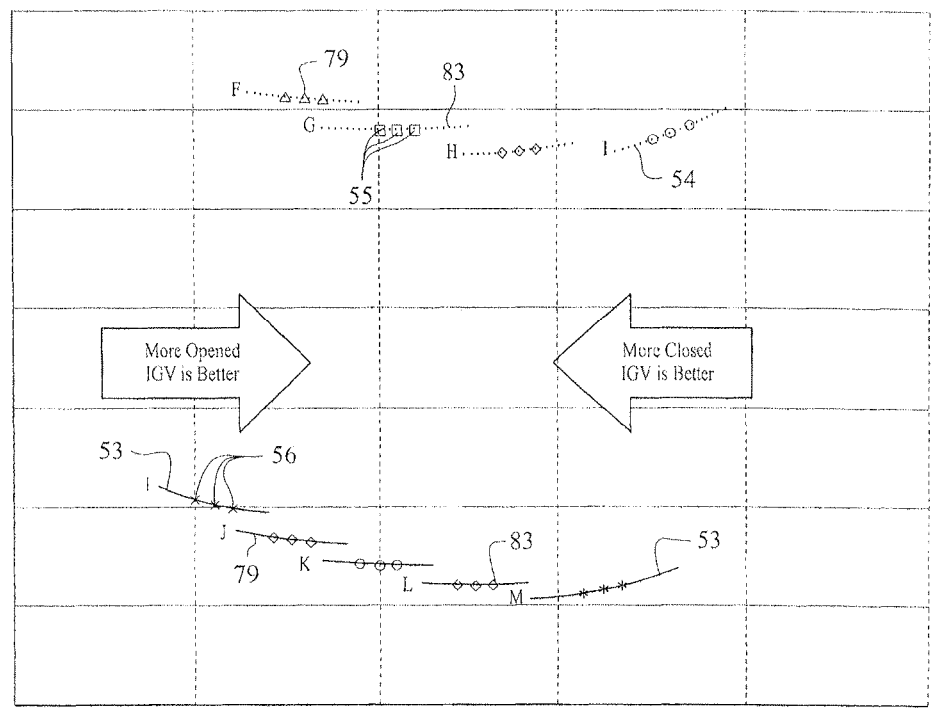

FIGS. 5 and 6 are charts of the heat rate of a gas turbine engine and the predicted heat rate generated by a model of the engine over a range of inlet guide vane angular settings. FIG. 6 is an enlarged view of FIG. 5.

The sold line curves 53 represent the heat rate predicted by the model for several, e.g., three, angular positions of the inlet guide vanes (IGV). Each solid line curve 53 corresponds to a different power output level generated by the model. The dotted line curves 54 represent the heat rate actually achieved by the gas turbine engine at the various power output levels.

The curved lines 53, 54 represent, respectively, the actual performance of the gas turbine and the modeled performance in response to a perturbation (deviation) of one or more control inputs. The curved lines 54, 53 are determined from data points 55, 56 generated from the model and engine operating at a power level and one of the control input conditions specified in the deviation sequence (($\Delta u(t)$). Each data point 55 of the actual heat rate represents the performance of the engine operating at a certain control input and power level. Multiple data points 55, e.g., three, are generated by perturbing one of the control inputs. The multiple data points taken at a common power level are connected to form the dotted curved line for the power level. Similarly, the multiple data points 56 for the engine performance predicted by the model at a common power level are used to form the solid curved line for the power level.

The dotted line curve for each power output level for the gas turbine engine has a corresponding solid line curve representing the predicted performance by the model at the same power output level. In FIGS. 5 and 6, each power level is represented by a letter A to L. The letter A may refer to a lowest power level and letter L refers to a highest power level. The power level may be uniformly incremented from letter to letter. The solid and dotted line curves with the same letter represent the predicted and actual performance, respectively, at the same power level. In FIG. 5, there are corresponding predicted and actual performance for each power level A to I, and only predicted performance for letters J to L.

The instructions, at step 60, cause the gas turbine engine to operate over a range of power outputs. A power sweep procedure may be calculated at standard day (ambient) conditions to determine a range of power output levels, e.g., megawatt (MW) levels, at which the deviations to the control inputs are to be applied. The model is also operated to simulate the operation of the engine over a similar range of power outputs.

At each power level (A to M) the engine is operated at the control inputs predicted by the model and at control inputs where one or more of the at control inputs has been perturbed. Before one or more of the control inputs are perturbed, the boundary limits in the model may be relaxed to allow the model to operate at control inputs that deviate from optimal values. Step 64. While one or more of the control inputs is perturbed, the other control inputs, such as inlet bleed heat (IBH) may be held constant. Similarly, while one or more of the control inputs are perturbed, the power output level of the model and engine are held constant. The power output level of the model and engine may be shifted to another level and the sequence of control deviations applied at the new level.

At each power level, the perturbation may be applied to just one control input, such as to the angle of the inlet guide vane. Step 66. For example, small angular changes, such as 0.5 degrees, may be applied to the inlet guide vane setting prescribed by the model. The 0.5 degree perturbation may be applied in increments, such as a 0.5 change from the prescribed inlet guide vane setting in one direction and a successive change in an opposite direction. Step 66.

The deviation sequence may include incremental perturbations to one of the control inputs. For example, the deviation sequence my include increments at zero (0) deviation from the predicted optimal control setting and both positive and negative deviations from the predicted optimal control setting. The curves represent the performance of the engine and model during each of the deviation sequence. The curve may have a positive or negative slope or substantially no slope.

The other control inputs may be held constant while the one input is perturbed during each deviation sequence. Similarly, the engine and model may be held to a constant power generation level during each deviation sequence. The deviation sequence may be repeated at a various power generation levels to generate the data needed to plot several curves shown on the charts shown in FIGS. 5 and 6.

Performance data, such as heat rate, is collected from the engine and model at each power level and specifically at the predicted optimal inlet guide vane setting and at each of the perturbations of the inlet guide vane settings. Step 68. The performance data is plotted as data points 54, 55 on the graphs shown in FIGS. 5 and 6.

The slope of each line represents the change in heat rate as a function of a change in the inlet guide vane angle. (dHR/dIGV). Step 70. The slope of the lines provide information regarding whether the inlet guide vane should be turned to be more opened or more closed to improve the performance, as is discussed in more detail below.

If a determination is made that the model should be adjusted to more accurately predict the performance of the engine, the model may be adjusted by, for example, changing multiplier values in the model for compressor efficiency and flow, and for turbine efficiency. A determination may be made that model should be adjusted if the difference 52 (FIG. 2) between the predicted optimal performance of the engine and the actual optimal performance is greater than a threshold amount. If the model is changed by applying or changing a multiplier applied to the compressor efficiency or airflow through the compressor values in the model, step 72, the steps 60 to 70 are repeated using the modified model. Changing the modifier for compressor efficiency or compressor flow alters the value used by the model for estimating compressor degradation in the engine. Another exemplary modification that may be made to the model is to add or change the multiplier for turbine efficiency in the model to adjust the amount of simulated turbine degradation used by the model. Step 74. In addition, the model may be changed by adjusting both the multiplier for the compressor efficiency and compressor flow, and the multiplier for turbine efficiency. Step 76.

By repeating steps 60 to 70 after each change made to the model, information is generated and plotted that is used to determine whether the new multiplier applied to the compressor efficiency or airflow (or both) in the model is a sufficient adjustment to the model such that the model accurately predicts the actual performance of the engine. Charts, such as shown in FIGS. 5 and 6, may be prepared for each sequence of steps and, specifically, after steps 68 and 70 are performed.

An alternative approach is to perform steps 60 to 70 once for both the model and engine, and thereafter holding the control inputs for the engine steady while the control inputs to the model are repeatedly perturbed until the predicted engine performance from the model converges to a more optimal set of control inputs. The more optimal control inputs are applied to the engine by repeating steps 60 to 70. The alternative approach may allow for a faster convergence on optimal or better control inputs than is achieved by just repeating steps 60 to 70 for both the model and engine.

In addition to or in conjunction with steps 60 to 70, the results obtained by perturbing the model or engine may be used to control further perturbations or adjustments to the control settings. For example, the slope of the data at each power setting provides information regarding the control input setting to achieve optimal engine performance. By comparing the slopes of the line 53, 54, a determination can be made as to whether the control setting should be adjusted and the direction of the adjustment. Step 78. A negative slope (79, step 80) indicates that the inlet guide vane angle should be increased and a positive slope (81, step 82) indicates that the angle should be decreased. The direction of further perturbations or changes in control inputs may be selected based on the slope of the data at one or more power settings. A flat line (zero slope 83, step 84) suggests that an optimal performance condition has been achieved. When an optimal performance condition is achieved, further perturbations or changes are unnecessary to achieve optimal engine performance at the power setting corresponding to the flat line.

The techniques disclosed herein for capturing responses to engine performance due to deviations applied to the control inputs, enable real time enhancements to be made to control inputs and model. These enhancements ensure that the engine operates at optimal settings despite variations between engines corresponding to the model and degradation of the engine.

The techniques disclosed herein provide information to adjust, e.g., fine tune, the control inputs to each engine. The information may indicate the amount and direction of adjustments to the control inputs. The information regarding the performance of the engine during the deviations to the control inputs may also be used to generate statistics, e.g., time trends, of the real time and historical performance of an engine.

The model is made to more accurately predict the optimal performance of the engine by periodically testing the model by perturbing the inputs to the mode and engine. Improving the accuracy of a model is a technical effect achieved with the perturbation technique disclosed herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to control a power generation plant comprising:
   applying control settings to operate the power generation plant;
   collecting plant data indicative of the performance of the power generation plant operating at the control settings in real time, wherein the control settings represent values for control parameters applied at certain periods of time during the real time operation;
   applying the control settings to a model of the power generation plant, wherein the model simulates the real time operation of the power plant and the control settings are applied to the model simultaneously with the application of the control settings to the power generation plant and the control settings applied to the model represent the same values for the control parameters at the same certain periods as applied to the power generation plant;
   collecting prediction data from the model indicative of the predicted performance of the power generation plant operating with the applied control settings;
   comparing the engine data to the predicted data to adjust the control settings applied to the power generation plant and model;
   perturbing at least one of the control settings and applying the at least one perturbed control settings to operate the power generation plant and to the model;
   collecting perturbed engine data indicative of the performance of the power generation plant operating at the at least one perturbed control settings;
   collecting perturbed prediction data from the model indicating the predicted performance of the engine operating at the applied perturbed control settings, and
   modifying the model if the perturbed power generation plant data represents an improvement as compared to the perturbed prediction data.

2. The method of claim 1 wherein the power generation plant includes at least one of a gas turbine engine, steam turbine, and heat recovery steam generator.

3. The method of claim 1 wherein the model is based on a software program executed by a computer.

4. The method of claim 1 wherein the at least one perturbed control settings is only one control setting and other control settings are held constant while the one control setting is perturbed.

5. The method of claim 1 wherein the step of modifying the model is performed after repeatedly performing at different power output levels the steps of perturbing the control settings and applying the perturbed control settings to operate the power generation plant and to the model and collecting perturbed engine data and the perturbed prediction data.

6. The method of claim 5 wherein the performance of the steps of perturbing the control settings is performed at various power levels of the plant.

7. The method of claim 1 wherein the step of modifying the model is performed only if the amount of the improvement exceeds a threshold.

8. The method of claim 1 wherein the steps of perturbing the control settings and applying the perturbed control settings to operate the power generation plant and to the model and collecting perturbed engine data and the perturbed prediction data are performed while the power generation plant operates at a constant power output level.

9. The method of claim 1 wherein the step of perturbing at least one of the control settings includes relaxing a boundary limit related to the at least one of the control settings.

10. A system to control a power generation plant comprising
    a computer and a non-transitory memory storing instructions that are performed to cause the system to:
    apply control settings in real time to operate the plant at a performance level determined by the control settings, wherein the control settings represent values for control parameters applied at certain periods of time during the real time operation;
    collect plant data indicative of the performance of the plant operating at the control settings;
    apply the control settings to a model of the plant, wherein the model simulates the real time operation of the power plant and the control settings are applied to the model simultaneously with the application of the control settings to the power generation plant and the control settings applied to the model represent the same values for the control parameters at the same certain periods as applied to the power generation plant;
    collect prediction data from the model indicative of the predicted performance of the plant operating at the applied control settings;
    compare the plant data to the predicted data to adjust at least one of the control settings applied to the plant and model;
    perturb the at least one control setting and apply the perturbed control setting to operate the plant and to the model;
    collect perturbed plant data indicative of the performance of the plant operating at the perturbed control setting;
    collect perturbed prediction data from the model indicative of the predicted performance of the plant operating at the applied perturbed control setting, and
    modify the model if the perturbed plant data represents an improvement as compared to the perturbed prediction data.

11. The system of claim 10 wherein the instructions are executed during operation of the plant.

12. The system of claim 10 wherein the instructions are executed at various power output levels of the plant.

13. The system method of claim 10 wherein the instructions to modify the model are performed after repeatedly executing the instructions to perturb the control settings and apply the perturbed control settings to operate the plant and to the model and collecting perturbed plant data and the perturbed prediction data.

14. The system of claim 10 wherein the instructions to modify the model are executed only if the amount of the improvement exceeds a threshold.

15. The system of claim 10 wherein the instructions for perturbing the control setting and applying the perturbed control setting to operate the plant and to the model and collecting perturbed plant data and the perturbed prediction data are performed while the plant operates at a constant power output level.

16. The system of claim 10 wherein the instructions to perturb the at least one control setting include instructions to relax a boundary limit related to the at least one control setting.

17. An assembly of plant and a controller including a computer and a non-transitory memory storing a program that when executed causes the controller to:
- apply control settings to operate the plant in real time at a performance level determined by the control settings, wherein the control settings represent values for control parameters applied at certain periods of time during the real time operation;
- collect plant data indicative of the performance of the plant operating at the control settings;
- apply the control settings to a model of the plant, wherein the model simulates the real time operation of the power plant and the control settings applied to the model simultaneously with the application of the control settings to the power generation plant and the control settings applied to the model represent the same values for the control parameters at the same certain periods as applied to the power generation plant;
- collect prediction data from the model indicative of the predicted performance of the plant operating at the applied control settings;
- compare the plant data to the predicted data to adjust the control settings applied to the plant and model;
- perturb at least one of the control settings and apply the perturbed control setting to operate the plant and to the model;
- collect perturbed plant data indicative of the performance of the plant operating at the perturbed control settings;
- collect perturbed prediction data from the model indicative of the predicted performance of the plant operating at the applied perturbed control setting, and
- modify the model if the perturbed plant data represents an improvement as compared to the perturbed prediction data.

18. The assembly of claim 17 wherein the program is executed during operation of the plant.

19. The assembly of claim 17 wherein the program is executed repeatedly during the operation of the industrial plant.

20. The assembly of claim 17 wherein the program steps to modify the model are performed after repeatedly executing the program to perturb the control setting, apply the perturbed control setting to operate the industrial plant and to collect perturbed plant data and the perturbed prediction data.

21. The assembly of claim 17 wherein the industrial plant is a gas turbine plant.

22. The assembly of claim 17 wherein the perturbation of the control settings and the application of the perturbed control settings operate the industrial plant and to the model and collecting perturbed plant data and the perturbed prediction data are performed while the industrial plant operates at a constant power output level.

23. The assembly of claim 17 wherein the program further causes the controller to relax a boundary limit related to the at least one control setting.

* * * * *